April 21, 1942.   N. M. McCULLOUGH   2,280,246
FUEL CONTROL MECHANICAL BREAKER SYSTEM AND INDICATOR
Filed Aug. 14, 1939   4 Sheets-Sheet 1
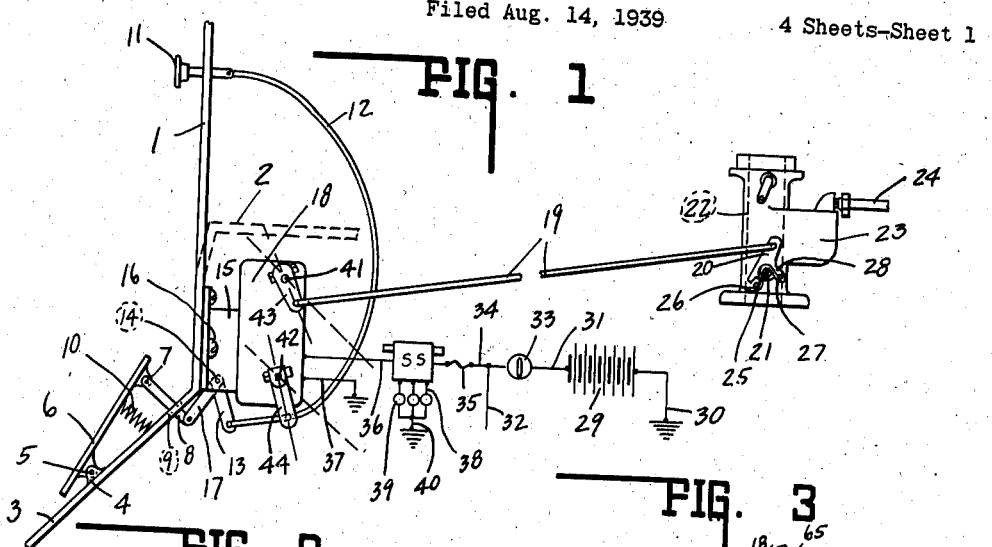
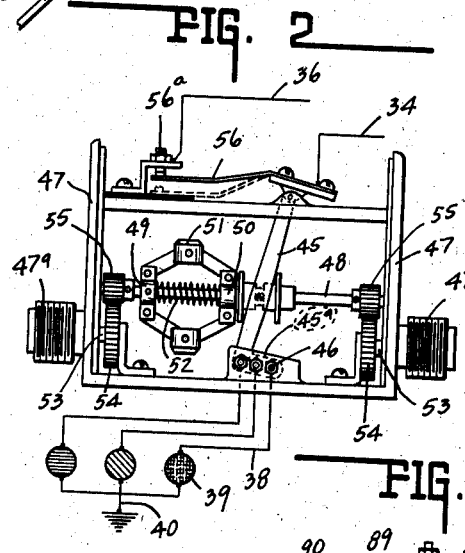
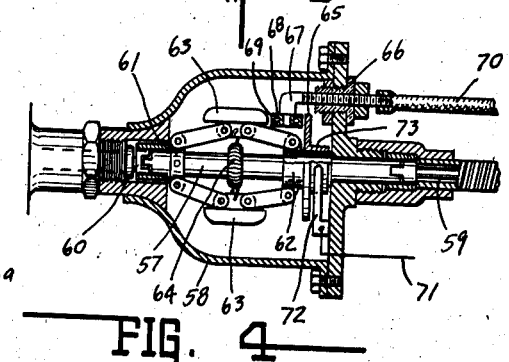
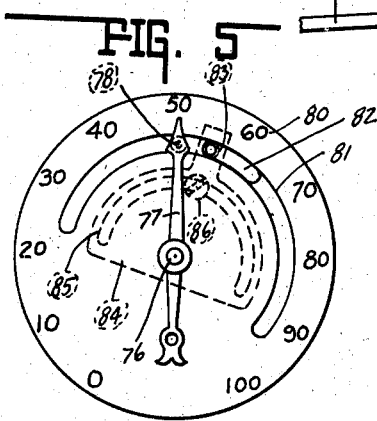
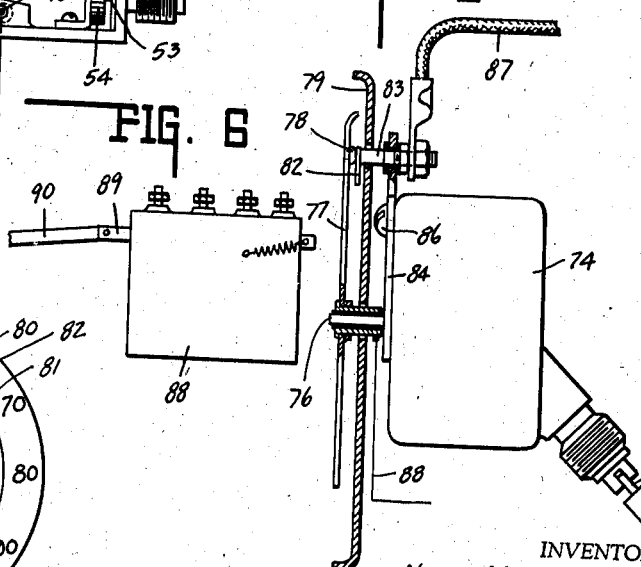
INVENTOR.
NEEL M. McCULLOUGH.
BY Lockwood, Goldsmith & Galt,
ATTORNEYS.

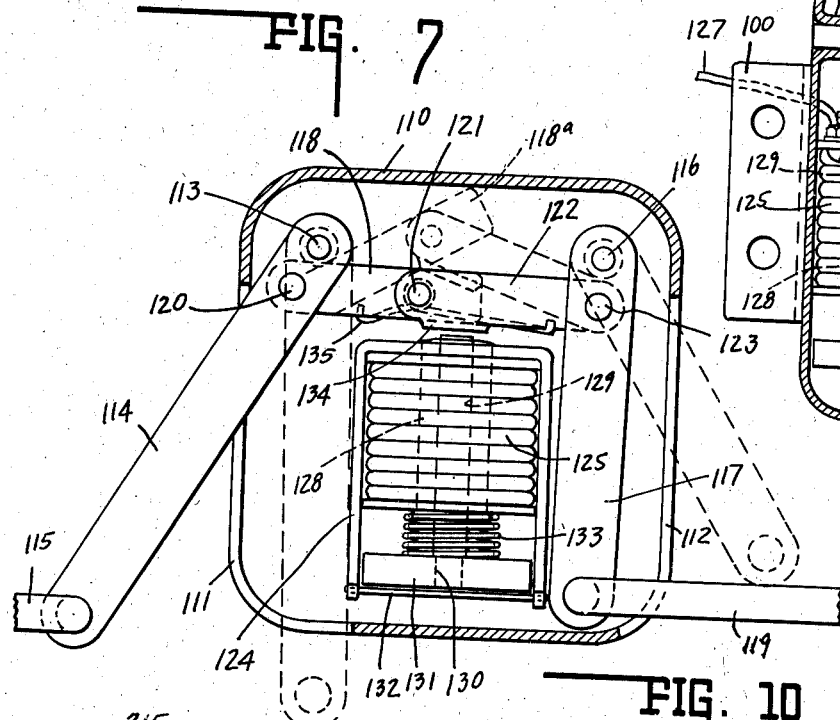

April 21, 1942.   N. M. McCULLOUGH   2,280,246
FUEL CONTROL MECHANICAL BREAKER SYSTEM AND INDICATOR
Filed Aug. 14, 1939   4 Sheets-Sheet 3
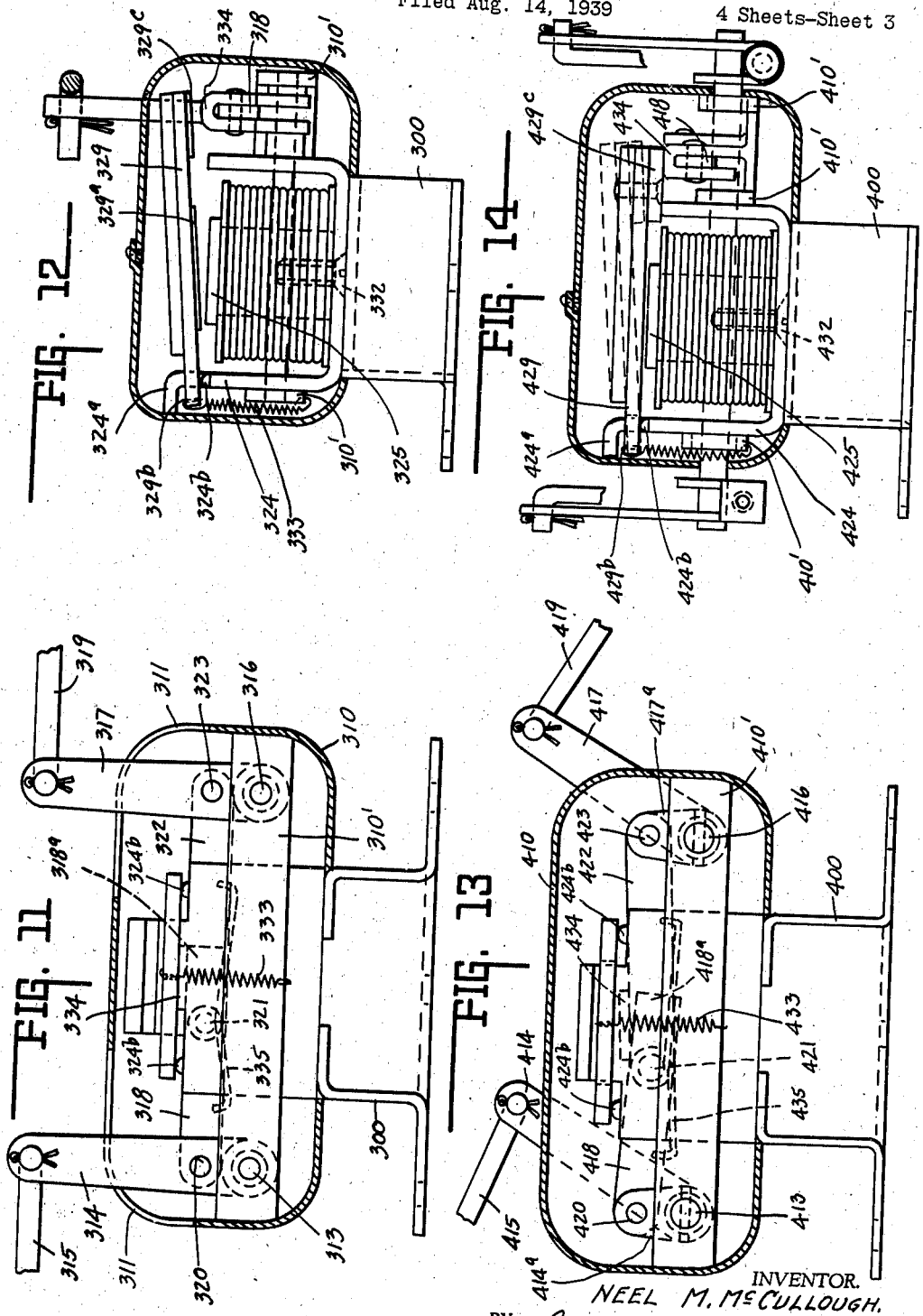
INVENTOR.
NEEL M. McCULLOUGH.
BY Lockwood, Goldsmith & Galt
ATTORNEYS.

April 21, 1942.   N. M. McCULLOUGH   2,280,246
FUEL CONTROL MECHANICAL BREAKER SYSTEM AND INDICATOR
Filed Aug. 14, 1939   4 Sheets-Sheet 4
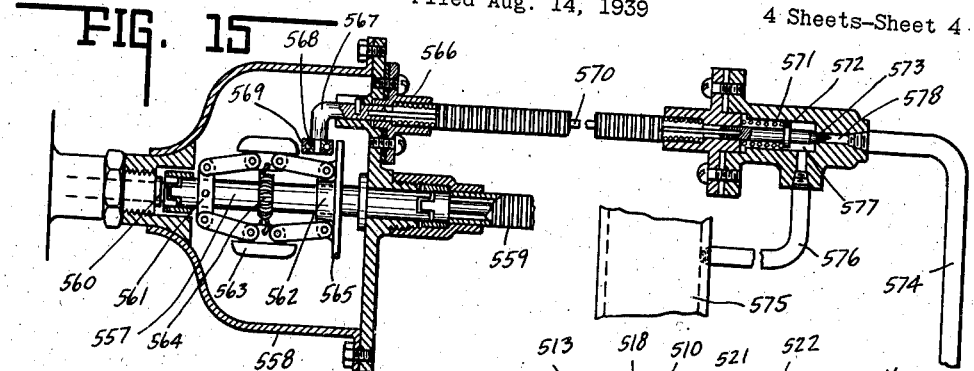
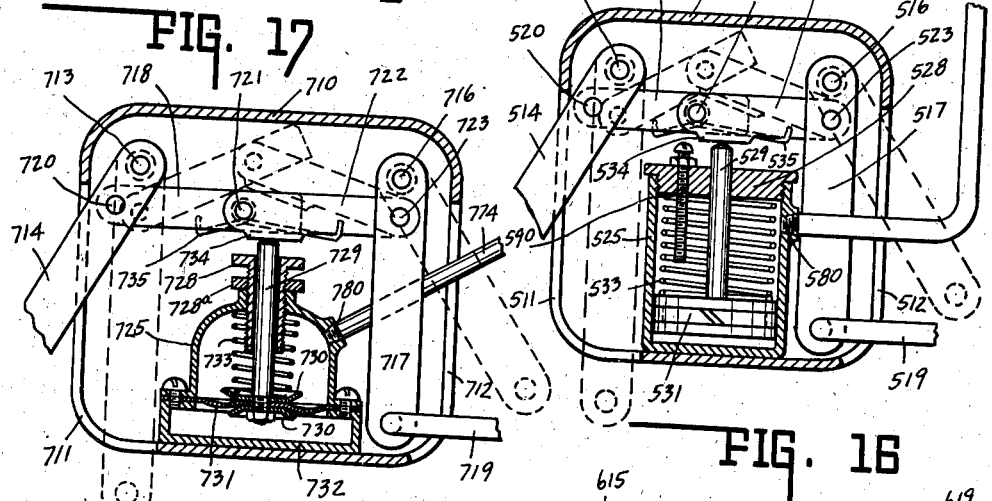
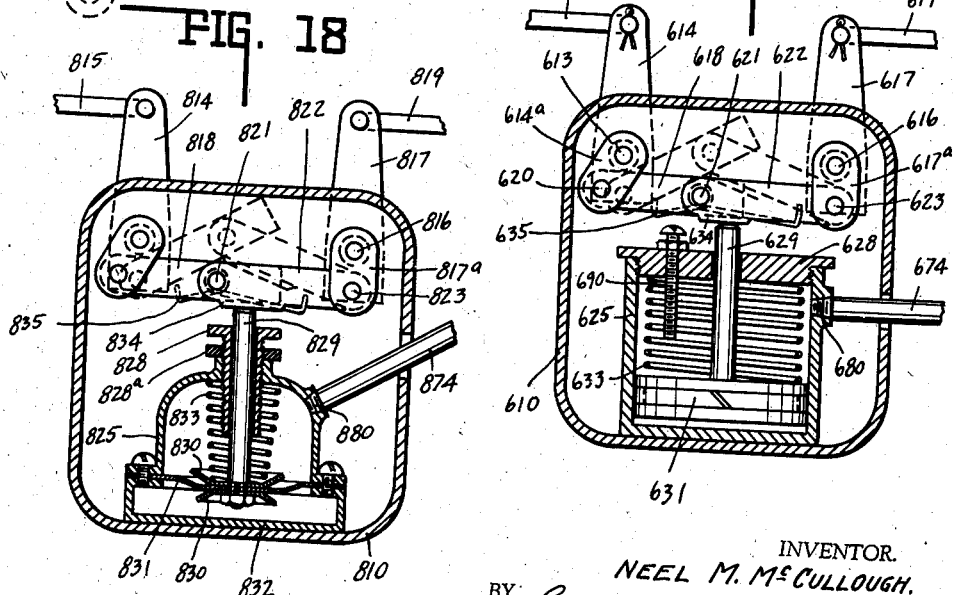
INVENTOR.
NEEL M. McCULLOUGH.
BY Lockwood, Goldsmith & Galt
ATTORNEYS.

Patented Apr. 21, 1942

2,280,246

UNITED STATES PATENT OFFICE 2,280,246

FUEL CONTROL MECHANICAL BREAKER SYSTEM AND INDICATOR

Neel M. McCullough, Anderson, Ind., assignor to Pierce Governor Company, Anderson, Ind., a corporation Application August 14, 1939, Serial No. 290,053

13 Claims. (Cl. 74—469)

This invention relates to a vehicle control and indicating system.

The invention is chiefly directed to taking away from the driver of the vehicle the ability to accelerate or overspeed when the vehicle speed is greater than for which the invention is adjusted to prevent overspeeding.

The invention also is adapted to indicate visually or otherwise, the instant operating speed range of the vehicle.

The present invention relates to certain subject matter disclosed in certain copending applications, to which reference will be had more fully hereinafter.

The chief feature of the invention is the arrangement whereby when a vehicle has attained a speed equal to or which exceeds that of the setting of a speed responsive device, said device is arranged to effect, as it were, a mechanical disconnection of the operating means between the manually operable throttle operating member and the fuel controlling throttle member and which will thereby prevent manual operation of the throttle until the vehicle speed falls below that of the set or predetermined speed.

The signal system is of advantage to the vehicle operator in that with loss of accelerating power or control over the vehicle, the operator is assured that this condition is the result of overspeeding only and not due to mechanical failure of the control system.

In the particular embodiment of the invention hereinafter described, the device is arranged so that when applied to a foot throttle arrangement, the operator first must remove his foot from the foot accelerator, and then the latter is automatically returned to its slow idle position before manual control can be renewed. To insure that the mechanism is fool-proof and positive in its action, the mechanism is arranged so that it includes an overcenter operable locking arrangement.

Other objects and features of the invention will be set forth more fully hereinafter.

The full nature of the invention will be understood from the accompanying drawings and the following description and claims:

In the drawings,

Fig. 1 is a diagrammatic elevational view of one embodiment of the invention.

Fig. 2 is an enlarged side elevational view of one form of switch structure and that illustrated in Fig. 1.

Fig. 3 is a central sectional view through a modified form of speed responsive switch.

Fig. 4 is a side view of still a further modified form of speed responsive switch.

Fig. 5 is a front elevational view of a portion thereof.

Fig. 6 is a side elevation of a Diesel fuel pump and a portion of the operating mechanism shown in Fig. 1.

Fig. 7 is an enlarged side view with the cover removed, of the so-called breaker.

Fig. 8 is a vertical section thereof, parts being shown in elevation.

Fig. 9 is a view similar to Fig. 7 and of a modified form of the invention.

Fig. 10 is a view similar to Fig. 8 and of the form of the invention shown in Fig. 9.

Fig. 11 is a view similar to Figs. 7 and 9 and of still a further modified form of the invention.

Fig. 12 is a view similar to Figs. 8 and 10 and of the form of the invention shown in Fig. 11.

Fig. 13 is a view similar to Figs. 7, 9 and 11 and of still a further modified form of the invention.

Fig. 14 is a view similar to Figs. 8, 10 and 12 and of the form of the invention shown in Fig. 13.

Fig. 15 is a diagrammatic illustration of a non-electrical piston actuated type of speed responsive breaker embodying certain features of Patent No. 2,142,403, entitled "Pressure operable governor actuated vehicle speed control" applied to the breaker shown in Fig. 7 hereof.

Fig. 16 is a view similar to a portion shown in Fig. 9 hereof, and Fig. 15 hereof.

Fig. 17 is a view similar to Fig. 16 showing a non-electrical diaphragm actuated type of speed responsive breaker applied to the breaker shown in Fig. 7 hereof.

Fig. 18 is a view similar to Fig. 16 showing the same type of power illustrated in Fig. 17 hereof but applied to the breaker shown in Fig. 9 hereof.

This invention as previously stated, embodies certain features of the following copending applications:

Fig. 3 herein is similar to the speed responsive switch mechanism shown in Fig. 1 of copending application, Serial No. 91,213, filed July 17, 1936, entitled, "Vehicle speed engine limiting device," and therein said switch is shown associated with an electrical operable means to control the fuel supply to the engine of the vehicle.

In copending application, Serial No. 100,650, filed September 14, 1936, and entitled, "Speedometer vehicle speed control," Figs. 1 and 3 thereof illustrate the speedometer type switch shown in Figs. 4 and 5 herein and the association of such a switch for controlling electrical operable means to control the fuel supply to the engine.

In copending application, Serial No. 180,497, filed December 18, 1937, entitled, "Vehicle control and speed indicating system," Fig. 1 thereof illustrates the combined speed responsive switch and speed signal indicating means and the switch means therefor, and the same disclosure appears herein in Fig. 2.

It is also to be understood that the disclosure found in Fig. 5 of said application is similarly found capable of incorporation in the present invention when similarly modified, as illustrated, with respect to other incorporations herein.

In copending application, Serial No. 181,680, entitled "Wide range governor for Diesel engines," filed December 24, 1937, Fig. 1 thereof shows a Diesel engine fuel pump, a fuel pump rod, and an actuating connection therefor, and the former is similar to that illustrated in Fig. 6 hereof.

All of the aforesaid patents and copending applications constitute inventions of Neel M. McCullough, and reference is had thereto for a more detailed explanation of the parts illustrated in Figs. 2 to 6, inclusive, and by reason of such more detailed explanation, reference hereto will be more or less of outline character and specific description will be directed to Figs. 1 and 7 to 18, inclusive.

In Fig. 1, the numeral 1 indicates the dash of a vehicle; 2 indicates a brace connected to the engine or the vehicle frame; 3 indicates the toeboard construction; 4 indicates a pivotal support which at 5 pivotally supports a foot throttle or accelerator pedal 6, pivotally connected as at 7 to a link 8, the latter extending through the opening 9 in the toe-board. A spring 10 operatively interposed between the accelerator pedal and toeboard, diagrammatically indicated herein, normally constrains the accelerator to the closed throttle position. Foot pressure on pedal 6 is opposed to said spring and normally serves to control the fuel supply to the prime mover unless modified as herein described.

Slidably mounted in the dash 1 is a hand throttle member 11 connected by the dash wire 12 to an arm 13 pivotally mounted as at 14 on a support 15 suitably mounted as at 16 on the dash. The arm 13 is one arm of the V-shaped lever, the other arm 17 thereof being pivotally connected to the other end of the link rod 8. Thus, the hand and foot throttle have simultaneous action. The wire 12 may be of Bowden character.

The portion 15 supports a housing 18 and extending therefrom is a rod 19. This rod 19 is connected at its remote or fuel controlling end to a lever 20 rigid with the shaft 21 that mounts a valve, not shown, in the intake passage 22 of the carburetor 23. The latter is supplied with fuel by the conduit 24. A spring 25 concentric with shaft 21 has one end portion mounted as at 26 upon the carburetor structure and the other end mounted as at 27 upon an extension 28 of the carburetor lever 20. The lever is thus constrained to low idle position.

There is also illustrated in Fig. 1 a source of energy such as the storage battery 29, which has one of its terminals grounded as at 30 to the frame. The other terminal is connected by the line 31 to the ignition circuit 32 by means of the ignition switch 33. The lighting system of the vehicle is not herein illustrated but it is associated with the aforesaid in the usual manner.

A branch circuit 34 includes a fuse structure 35 and said branch leads to a switch structure designated by letters SS. The switch structure includes a line 36 which leads to an electrically operable mechanism within the housing 18 and from said mechanism a line 37 leads to suitable ground connection. Associated with the switch SS and leading therefrom are three lines 38, each of which leads to an illuminable signal 39. The signals are grounded as at 40. These signals are progressively illuminated as the switch mechanism is actuated in response to speed variation of the vehicle. This specific switch structure shown in Fig. 1 is illustrated more in detail in Fig. 2.

In the form of the invention shown in Fig. 1, there extends or projects from the housing 18, shafts 41 and 42 and each of them mounts a lever arm 43 and 44, respectively. Arm 43 in the present instance is connected to the near end of rod 19. Arm 44 in the present instance is shown connected to the wire 12 and thus directly associated with the hand throttle 11 and/or the foot throttle 10.

The hand and foot throttle may be connected together and lever 44 in any desired manner, the connections between these two throttles being common in the automotive art.

Reference now will be had more especially, but briefly, to Fig. 2. In Fig. 2, the numeral 34 indicates the supply line to the switch and 36 the supply line from the switch to the electrical operable device included within the housing 18. The numeral 38 indicates the supply lines to the several illuminable signals 39 grounded as at 40. The switch member 45 is arranged to successively contact or non-contact the terminals 46 of the signal circuits as the speed of car increases or decreases. The arm 45 has a tail portion 45a so that one, two or three signals may be simultaneously energized at desired speeds. If desired, this tail portion may be omitted and thus individual progressive signal indication will be obtained. The numeral 47 in Fig. 2 indicates the main frame of the switch structure designated by SS in Fig. 1.

Mounted therein is a shaft 48 which has pinned to it a collar 49 and said shaft has slidably mounted thereon the collar 50. These collars are connected by the links and weights, designated by the numeral 51. The collars are constrained toward spaced relation by the spring 52, herein shown concentric with the shaft. The two collars are constrained toward approaching relationship by means of centrifugal force.

The housing 47 includes two threaded extensions 47a adapted to detachably connect to a speedometer cable construction and within each is a driving structure, and reference is had to the copending application Serial No. 180,497 before mentioned for a detailed description thereof. The shafts 53 mount gears 54 meshing with pinions 55 carried by the countershaft 48. Thus, countershaft 48 is rotated at a speed proportional to the speedometer drive shaft speed and, therefore, proportional to vehicle speed. Thus, the signals 39 may be individually and successively energized and deenergized or may be energized in succession so that one or more of the signals are illuminated or deenergized, depending on the vehicle speed. These illuminable signals may be positioned forwardly of the vehicle, rearwardly thereof, or in any other convenient location, or the signals may be duplicated for exterior and interior application upon the vehicle, all for the purpose as described in the copending application last referred to. For clearness, only one set of signals is illustrated, it being understood that any and all additional sets would be in multiple therewith.

When a simpler form of the invention is contemplated, the signal switch construction may be omitted and only the speed operable switch indicated generally by the numerals 56 and 56a may be employed. In this event, any form of speed operable switch structure such as illustrated and described in the copending application, Serial No. 91,213, may be employed. Reference is now had to Fig. 3 which illustrates the same. In said figure, the shaft 57 suitably mounted within the housing 58 is arranged for connection at opposite ends to speedometer drive shaft mechanism, indicated generally by the numerals 59 and 60. Shaft 57 carries a fixed collar 61 and slidably supports a collar 62. The weight mechanism 63 is normally constrained by the spring 64 so the two collars tend to maintain spaced relation. When the shaft is rotated at sufficient speed, the weights 63 tend to separate in opposition to spring 64, depending upon the centrifugal force exerted upon the weights.

Rigid with the slidable collar 62 is a plate 65. Adjustably mounted in insulated relation as at 66 is an angle shaped contact member 67 which rotatably mounts through an anti-friction construction 68 the contact roller 69. Current is supplied by line 70 to the electrical operable device within the housing 18 shown in Fig. 1.

A current supply line 71 connects to a friction brush 72 that engages the hub portion 73 of the plate 65. In this form of the invention, plate 65 and its sleeve or hub portion is rigid with the sliding collar 62 but is insulated therefrom. The length of longitudinal travel of the sliding collar is such it is not sufficient to permit the brush 72 to become disengaged from the ring portion 73 of the plate 65.

In Figs. 4 and 5 there is illustrated a modified form of speed control switch structure which does not embody the centrifugally operated weight arrangement and in said figures 74 indicates the speedometer mechanism proper, 75 the power supply thereto, 76 the shaft mounting the speed indicating needle 77, which herein is shown provided with a contact member 78. The plate portion 79 is provided with suitable rate legending, indicated by the numeral 80. Said plate is arcuately apertured as at 81 and in it is exposed an arcuate switch segment 82 carried by the stem portion 83 in turn mounted on the plate 84.

Plate 84 is provided with an arcuate slot 85 and screw 86 therein clampingly adjusts the position of said plate upon the speedometer housing 74 and with reference to the speed indication 80 so that as shown in Fig. 5, the speedometer needle 77 will complete the circuit through the speedometer switch at 55 miles per hour, if that be the scale of rate of speed employed.

The elongated arcuate tail portion 82 is provided to insure that after the needle contact 78 contacts the same, if a vehicle be accelerating, the switch circuit will be maintained even though the actual vehicle speed be continually increased. It is estimated a range of 10 miles per hour is sufficient to insure certainty of contact and maintenance thereof until the vehicle speed falls below the adjusted 55 miles per hour setting. The line 87 supplies current to the arcuate member 82 and a line 88 may constitute the return from the switch, or vice versa.

This connection 88 is shown diagrammatically herein but it is to be understood that preferably the circuit is of insulated character and in that event, the needle and its support upon the shaft 76 will be insulated from said shaft and a line 88 will be associated therewith by a brush structure.

It is to be understood that in connection with the electrical operable mechanism enclosed within housing 18 of Fig. 1 that any one of the switch mechanisms which are speed responsive, as illustrated in Figs. 2 or 3 or Figs. 4 and 5, may be employed therewith.

In Fig. 6 there is diagrammatically illustrated a Diesel fuel pump 88 having the pump rod 89. As well understood by those skilled in the Diesel engine art, movement of this pump rod to and fro varies the amount of fuel supplied to the Diesel engine and thereby regulates its speed. The numeral 90 herein indicates a member comparable to member 19, see Fig. 1, and the other end of member 90 may be connected to the arm 43. Thus, an automotive vehicle equipped with a Diesel engine, as distinguished from a conventional engine employing a carburetor device, may be similarly controlled.

Having thus briefly described certain of the essential parts of the basic combination with reference to Fig. 1 and several of the possible modified forms of power and switch mechanisms responsive to speed, reference will be had now to Figs. 7 to 18, inclusive, for a more complete description and understanding of the mechanism embodied within the housing 18. In the following description, numerals of the 100 series will indicate certain parts found in Figs. 7 and 8. Likewise, numerals of the 200 series will indicate like or similar parts in Figs. 9 and 10. Numerals of the 300 series will indicate like or similar parts found in Figs. 11 and 12, and numerals of the 400 series will indicate like or similar parts found in Figs. 13 and 14.

Numerals of the 500 series will indicate like or similar parts found in Fig. 15. Numerals of the 600 series will indicate like or similar parts found in Fig. 16. Numerals of the 700 series will indicate like or similar parts found in Fig. 17, while numerals of the 800 series will indicate like or similar parts found in Fig. 18.

In Figs. 7 and 8 the parts are illustrated or shown in what corresponds to the slow idle position. The dotted lines indicate the parts in the position which they assume when the electrical operable device has been energized and the speed control is superposed on the entire system, which control is effected by effecting, as it were, a breaking of the mechanical connection between the hand and/or foot throttle and the carburetor or Diesel fuel pump control rod depending upon which type of prime mover is employed.

In Fig. 7, the numeral 110 indicates a housing structure, comparable to housing 18, see Fig. 1, and herein illustrated as provided with two cutout portions 111 and 112. Pivotally mounted on the shaft 113 is a lever 114 connected to a manually operable member 115. This manually operable member 115 corresponds to the direct connection or the indirect connection to the hand and/or foot throttle.

Pivotally mounted on the shaft 116 is a lever 117 connected to the member 119 corresponding to the member 19, shown in Fig. 1 or member 90 shown in Fig. 6. A link 118 is pivotally connected as at 120 to lever 114 and in turn is pivotally connected as at 121 to another link member 122 pivotally connected at its opposite end as at 123 to the arm 117.

Within the housing 110 is U-shaped auxiliary frame 124. In it is suitably secured electromagnet 125, one terminal being grounded and the other terminal 126 being connected by line 127 to any one of speed responsive switch structures, previously mentioned.

The tubular core of the electromagnet indicated by the numeral 128 slidably supports a plunger 129 which is extended downwardly in the present instance and terminates in an anchorage 130 for a plate 131 slidably supported within the frame 124 and normally resting on the stop and frame arms connecting member 132. The coil spring 133 interposed between the electromagnet and the plate 131 normally constrains the plunger or core 129, as shown in Fig. 7. As long as the parts remain in the full line position, the connections between the manually operable members, to-wit, the hand throttle and/or foot accelerator, and the fuel supply control, such as the carburetor throttle valve or the Diesel engine fuel pump control rod, is positive and direct.

As soon as the vehicle attains the speed for which the speed responsive switch is set, current is supplied to the electromagnet 125, it is energized which attracts the plunger and the member 131 so that the member 131 tends to move toward the electromagnet in opposition to spring 133 and in so doing, the upper end of the plunger 129 engages the bearing plate 134 carried by the link 122 and the two links thereupon fold in opposition to spring 135. This action is such that the plunger initially moves this linkage from slightly overcenter position into center position and thence beyond the same into the dotted line position.

When positioned as shown in the dotted lines, the member 119 may be said to be operatively disconnected from the member 115 and referring to Fig. 1, the spring 25 thereupon becomes effective to move the carburetor throttle valve to the slow idle position. This slow idle position is, as stated, shown with respect to parts 117 and 119 by the full lines in Fig. 7. The operator of the vehicle, therefore, must permit the accelerator or hand throttle to return or must return the same to the slow idle position before the linkages again become aligned and snap into operative connected position, slightly overcenter. Thus the accelerator is operatively connected to the carburetor throttle and such positive connection is maintained as long as the vehicle does not exceed the predetermined speed for which the speed responsive switch has been set or adjusted.

The mechanical construction and arrangement of the parts will be clearly understood by reference to Fig. 8. The slight movement overcenter of the toggle or elbow lever arrangement approximately .010 by means of the hairpin spring 135, provides a lock, as it were, for maintaining the parts in the operative connected relation until such time as this lock is positively disengaged by means of electromagnet operation and the parts are caused to assume the dotted line position, see Fig. 7, whereupon the so-called disconnection feature is then embodied in the invention.

The form of the invention illustrated in Figs. 9 and 10, it will be obvious, is quite similar to that illustrated in Figs. 7 and 8. As stated, numerals of the 200 series, comparable to the 100 series numbers, indicate like or equivalent parts. The distinction to be found in this form of the invention is that the type of arm structures is slightly different and instead of the links being directly connected to the external levers, the same are indirectly connected thereto through auxiliary lever arms carried by the interposed shafts. In this form of the invention, to briefly emphasize the major difference, the short lever arm 214a is rigid with the shaft 213 mounting in exposed relation to housing 210 the lever arm 214, the same being mounted as indicated in Fig. 10, wherein the arm is split and the split portion supports a bolt 250 threaded into a nut 251, preferably rigidly associated or seated in a notch 252 formed in part of the return bend portion of the lever arm. The return bend portion, as indicated at 214b, thus provides a dual bearing for the lever on the shaft 213 to which it is secured. This permits the mechanism to be assembled as a unit and the lever arms 214 and 217 to be rigidly adjusted in position on the shafts 213 and 216 and, therefore, is adapted for universal inclusion in various types of carburetor controls employed in different kinds of vehicles.

In a like manner, the arm 217 is externally mounted on the housing projecting end of the shaft 216 and suitably secured thereto is a short arm 217a within the housing 210. The operation of the mechanism shown in Figs. 9 and 10 is substantially the same as that previously set forth with reference to the mechanism illustrated in Figs. 7 and 8.

Figs. 11 to 14 represent a solenoid embodiment of the invention as distinguished from the electromagnetic type. Also the same represent a clapper actuated embodiment thereof instead of a plunger actuated type. Figs. 11 and 12 represent what might be termed the enclosed type, while Figs. 13 and 14 illustrate what might be termed the exposed type.

The housing 310, see Figs. 11 and 12, is slotted as at 311 and in each of the slots 311 is positioned a lever 314 or 317 connected respectively to the rod member 315 or 319, in the manner illustrated or in any other suitable manner. The levers 314 and 317 are mounted on the shafts 313 and 316, respectively, in turn pivotally mounted in the portions 310' which pivotally support said shafts in spaced relation and in spaced bearings.

Pivotally connected to the lever 314 is a link 318. Pivotally connected to the lever 317 at 323 is the link 322. These two link members are pivotally connected together at 321 and a biasing or locking spring 335 normally constrains said links into the slightly overcenter position. The U-shaped member 324 suitably supports a solenoid structure 325 the same being secured together as at 332. The solenoid structure has an exposed portion 325 for attracting the clapper keeper mechanism to it. One arm of the U-shaped frame 324 is slotted as at 324a and the lower portion of the slot is rounded as at 324b to form a fulcrum for the arm 329. The arm 329 constitutes the keeper which may be provided, if desired, with an additional contact plate member 329a.

The keeper 329 may be provided with a striking plate 329c which is adapted to engage the lateral portion 334 of one of the links when it is in slightly overcenter position to cause the same to move into the broken joint position. A spring 333 has one end secured as at 329b to the keeper structure 329. The opposite end of the spring may be secured to one of the members 310' or a suitable portion of the U-shaped frame or the housing structure 310. The operation of the device is as follows: Upon speed responsive switch energizing the circuit, the solenoid is actuated to attract the keeper which at 329c "breaks" the positive connection between members 315 and 319 in substantially the manner previously described.

Reference now will be had to Figs. 13 and 14 in which numerals of the 400 series indicate parts similar or like the 300 series parts illustrated in Figs. 11 and 12. This form of the invention, as previously set forth, illustrates the main lever arms 414 and 417 externally positioned with respect to the housing 410. Said lever arms are mounted on the projecting ends of the shafts 413 and 416 suitably mounted in spaced bearings in the members 410' suitably secured to the housing. The clapper mechanism is substantially the same as that previously described and illustrated more specifically in Figs. 11 and 12. The broken joint connection is also substantially the same. The remote ends of the links 418 and 422 are, however, pivotally connected at 420 and 423, respectively, to the auxiliary lever arms 414a and 417a carried upon the shafts 413 and 416, respectively, and internally of the housing. These auxiliary lever arms shown in Figs. 13 and 14 are preferably of U-shaped formation. If desired the U-shaped frame structure or the housing may be provided with stops to limit the extent of the broken joint movement. The lever arms 414 and 417 are of the same general character as that illustrated in Fig. 10.

The operation of the "breaker" shown in Figs. 13 and 14 is substantially the same as that illustrated in Figs. 11 and 12.

It is to be observed that in the four modifications illustrated in Figs. 7 to 14, inclusive, that one link member of the toggle mechanism includes the portion 134, 234, 334 or 434 adjacent the pivotal connection 121, 221, 321 or 421, respectively, and that the other link member herein 118, 218, 318 or 418, respectively, includes an extension 118a, 218a, 318a or 418a, respectively, and these two portions cooperate to prevent undue movement in the overcenter position. For the purpose of clearness, the stop or stops, and preferably two are utilized, for limiting the toggle joint movement into the broken joint position have been omitted.

It will also be observed that there is suitably secured to the housing, or if the housing be made removable, there is suitably secured to the U-shaped frame, a base structure 100, 200, 300 or 400, respectively, referring to Figs. 7 and 8, 9 and 10, 11 and 12, or 13 and 14. It will also be observed that while Figs. 13 and 14 do not illustrate the additional members comparable to portions 329a and 329c, the same may be provided. It will also be observed that member 329c may be of such character or material, such as for example fibre, so that in its contact with the joint lever construction adjacent the pivotal connection, it will make contact and in a relatively silent manner.

It will also be observed the actuating force for breaking the joint, as it were, is applied to the lateral portion 134, 234, 334 or 434 in Figs. 7, 9, 11 or 13, respectively. Thus these portions serve a dual function, to-wit, constituting a part of the overcenter movement limiting means of the toggle structure and also constituting the contact portion for the member supplying the "breaking" force.

While Figs. 7 to 14 illustrate the several levers 114 and 117, 214 and 217, 314 and 317, or 414 and 417 as being positioned upon the same side of the device, it will be readily apparent that one lever may be positioned upon one side of the device and the other lever upon the opposite side thereof, and either internally or externally with respect to the respective housings 119, 210, 310 or 410.

From the foregoing, therefore, it will be understood that when the speed responsive switch mechanism, previously described and of any one of the characters previously described, is actuated, the electrically operable mechanism within the housing 18, see Fig. 1 and illustrated more particularly in the last described Figures 7 to 14, the direct connection between the manually operable member, such as the foot or hand throttle, or both, and the fuel controlling member, such as the carburetor valve, is broken. In other words, such mechanism serves as a breaker structure.

It will also be noted that when the switch is of the character illustrated in Fig. 2, the device is capable of indicating the operating range of speed within which the vehicle is then travelling and these signals 39 may be of different color to conform to speed regulations and may be visible from within and/or without the vehicle equipped with this invention.

To avoid any misconception of the scope and application of this invention, there is by way of example illustrated several fluid pressure operable embodiments. By fluid pressure, reference is had chiefly to the application of suction, although as is now quite common in certain automotive installations air brakes are employed, which are operable from a source of pressure, usually a reservoir charged and maintained at operating pressure by the vehicle prime mover.

So that in the subsequent description of fluid pressure operable embodiments, as applied to suction, the same mechanism may be operated by a pressure application although in these instances the force of the opposing spring would be of directly opposite character, or the fluid pressure oppositely exerted.

In Fig. 15, numerals 557, 558, 559, 560, 561, 562, 563, 564, 565, 566, 567, 568, 569 and 570 indicate parts identical or substantially similar to the primary numeral indicated parts in Fig. 3, with the exception that wire 570 is movable by and with angular member 567 being constrained in opposition thereto by spring 571 bearing against shoulder 572 of needle valve 573 controlling conduit 574.

The source of pressure fluid in this case is the prime mover intake 515 and conduit 576 freely communicates therewith and chamber 577 having port 578 controlled by the needle valve 573 and freely communicating with conduit 574, when the valve is open.

When the vehicle speed is such that plate 565 has moved toward collar 561 to engage roller 569 and moves valve 573 in opposition to spring 571 suction from the engine intake is applied to conduit 574.

It will be quite obvious that the aforesaid may be so arranged that conduit 576 connects to a regulated source of fluid pressure such as the brake reservoir, in which event, conduit 574 would be subject to pressure above atmospheric instead of below atmospheric, as illustrated herein.

Referring to the lower right hand portion of Fig. 15, there is illustrated a fluid pressure operable embodiment of breaker. This is an exact counterpart of that illustrated in Figs. 7 and 8. Thus, cylinder 525 communicates at 580 with conduit 574. Spring 533 normally constrains piston 531 toward non-breaking position. The stem 529 is slidably supported by the cylinder head 528. An adjustable stop 590 limits the "breaking" travel of the stem.

When the speed responsive control is actuated by the vehicle attaining the speed for which the control is adjusted to operate, valve 573 is opened and engine suction is applied to cylinder 525 and piston 531. The latter moves in opposition to spring 533 so that stem 529 engages portion 534 and "breaks" the connection.

As long as the vehicle overspeeds this "broken joint" condition is maintained with the result that any manual attempt to accelerate the prime mover will be prevented, and the parts remain in this position until the parts are repositioned in "slow idle." With the parts in that position and valve 573 closed, then and then only is the proper or rigid joint connection automatically reestablished, the spring 533 returning the piston and stem to what corresponds to the "slow idle" position.

In Fig. 16, there is illustrated a counterpart embodiment of the Figs. 9 and 10 embodiment of the invention, but differing therefrom in exactly the same manner as Fig. 15 embodiment differed from the embodiment shown in Figs. 7 and 8. In Fig. 16, numerals of the 600 series indicate like or similar parts and this embodiment operates as described relative to Fig. 15 so far as its power is concerned and relative to Figs. 9 and 10 so far as its "broken joint" connection is concerned. No further detailed description is therefore believed necessary.

In Fig. 17, there is illustrated an embodiment similar to that shown in Fig. 15. Numerals of the 700 series indicate like or similar parts. This embodiment differs from that shown in Fig. 15 only by the substitution of a diaphragm for a piston so that the specific description will be confined solely thereto.

A base 732, and a chamber member 725 have secured therebetween a diaphragm 731 which by means of disks 730 rigidly unite thereto the stem 729 slidable in threaded guide 728 locked as at 728a, the inner end of the guide serving as diaphragm stop, if desired.

The upper disk 730 and guide 728 serve with chamber member 725 to seat a spring 733 encircling the stem and normally constraining the diaphragm and stem to "rigid joint" position. When suction is applied to conduit 774 "broken joint" action occurs. In view of the several specific preceding descriptions, no further description is believed necessary, relative to Fig. 17.

In Fig. 18, numerals of the 800 series indicate like or similar parts. This embodiment is similar to that illustrated in Figs. 9 and 10 and Fig. 16 only a diaphragm type power is included herein. No further description is believed necessary.

For use when pressures, greater than atmospheric, are employed, it is to be understood that the fluid pressure valve controlled conduit, instead of communicating with the cylinder or diaphragm chamber ahead of the piston or diaphragm respectively, would communicate therewith below the same and the devices each would severally function substantially as hereinbefore described.

It will also be apparent that so far as the "clapper" type breaker is concerned, see Figs. 11 to 14 inclusive, the fluid pressure powers illustrated in Figs. 15 to 18 inclusive may be associated therewith only that the powers would be positioned in inverted relation above the clapper and the latter would be forced downward by outward (and herein downward) movement of the stem of the respective embodiment utilized whether of suction operable or pressure (greater than atmospheric) operable type.

Briefly stated therefore this invention is basically directed to a speed responsive control combined with a "breakable" coupling between a manual control and a vehicle prime mover normally controlled thereby which manual control is lost when the vehicle exceeds a predetermined speed and is not regained (and then automatically) until the prime mover and the vehicle are moving at what corresponds to "slow idle" prime mover speed, and the manual control is at slow idle.

This invention is further directed to a speed signal system having the several features mentioned, among which is that of indicating to the vehicle driver that it is the vehicle control which is effective and it is not a mechanical failure of the fuel control system which has taken away from the driver the control of the prime mover.

While the invention has been illustrated and described in great detail in the drawings and foregoing description, the same is to be considered as illustrative and not restrictive in character.

The several modifications illustrated and/or described and/or suggested herein, as well as others which will readily suggest themselves to persons skilled in this art, all are considered to be within the broad scope of the invention, reference being had to the scope of the appended claims.

The invention claimed is:

1. A throttle breaker construction interposed between and relatively permanently connected to a pair of members and adapted for "connecting" and "disconnecting" same, including a pair of levers each connected to a member, a pair of pivotally connected members, each pivotally connected to a lever, the pivotally connected members when longitudinally aligned "connecting" said first mentioned members, and power means for moving the pivotally connected member to "disconnected" position.

2. A throttle breaker as defined by claim 1 characterized by the addition of spring means normally constraining said pivotally connected members toward connected position.

3. A throttle breaker as defined by claim 1 characterized by the addition of means limiting the pivotal movement of the pivotally connected members in the connecting direction.

4. A throttle breaker construction interposed between and relatively permanent connected to a pair of members and adapted for connecting and disconnecting same, including a pair of pivotally connected members, each operatively connected to a first mentioned member for movement therewith, said pivotally connected members constituting a toggle type arrangement, means normally constraining the pivotally connected members to aligned relation, and power means for moving the toggle type members into angular relation in opposition to the constraining means.

5. A throttle breaker as defined by claim 4 characterized by the addition of means limiting the movement of the toggle forming members beyond the aligned relation, and means normally constraining said toggle type members toward the aligned and limited position.

6. A throttle breaker construction adapted for connecting and disconnecting a pair of members including a pair of levers each connected to a member, a pair of pivotally connected members connected to said levers, power means for moving both last mentioned members to disconnecting position, and a lever between each first mentioned lever and the pivotally connected thereto.

7. A throttle breaker construction adapted for connecting and disconnecting a pair of members including a pair of pivotally connected members, each operatively connected to one of the first mentioned members for movement therewith, said pivotally connected members constituting a toggle type arrangement normally constrained to aligned relation, power means for moving the toggle type members into angular relation, and a lever between each first and second mentioned member connected thereto.

8. A throttle breaker construction adapted for connecting and disconnecting a pair of members including a pair of pivotally connected members, each operatively connected to one of the first mentioned members for movement therewith, said pivotally connected members constituting a toggle type arrangement normally consrained to aligned relation, power means for moving the toggle type members into angular relation, and a dual arm lever mechanism interposed between each first and second mentioned member connected thereto.

9. A throttle breaker construction adapted for connecting and disconnecting a pair of members including a pair of pivotally connected members, each operatively connected to one of the first mentioned members for movement therewith, said pivotally connected members constituting a toggle type arrangement normally constrained to aligned relation, power means for moving the toggle type members into angular relation, and a dual arm lever mechanism interposed between each first and second mentioned member connected thereto, and a housing for said breaker, one arm of each dual lever mechanism being positioned exteriorly thereof and the other arm being within the housing.

10. A throttle breaker construction adapted for connecting and disconnecting a pair of members including a pair of pivotally connected members, each operatively connected to one of the first mentioned members for movement therewith, said pivotally connected members constituting a toggle type arrangment normally constrained to aligned relation, and power means for moving the toggle type members into angular relation, the pivotally connected members, and power means having a superposed relationship therebetween.

11. A throttle breaker construction adapted for connecting and disconnecting a pair of members including a pair of pivotally connected members, each operatively connected to one of the first mentioned members for movement therewith, said pivotally connected members constituting a toggle joint type arrangement normally constrained to aligned relation, and power means for moving the toggle type of members into angular relation, the pivotally connected members, and power means having a side-by-side relationship therebetween, said power means including means extending across the same and the pivotally connected member for operating the latter in accordance with power means operation.

12. A throttle breaker construction as defined by claim 1, characterized by said power means being of electrical character.

13. A throttle breaker construction as defined by claim 1, characterized by said power means being of fluid pressure operable character.

NEEL M. McCULLOUGH.